United States Patent [19]
Rosenfeld et al.

[11] 3,885,875
[45] May 27, 1975

[54] NONCONTACT SURFACE PROFILOMETER
[75] Inventors: Alvin H. Rosenfeld, Cromwell; Carl A. Zanoni, Middletown, both of Conn.
[73] Assignee: Zygo Corporation, Middlefield, Conn.
[22] Filed: July 29, 1974
[21] Appl. No.: 492,781

[52] U.S. Cl. .................... 356/120; 356/4; 356/118; 356/167
[51] Int. Cl. ............................................ G01b 11/30
[58] Field of Search ............ 356/2, 4, 120, 118, 167

[56] References Cited
UNITED STATES PATENTS
3,679,307  7/1972  Zoot et al. ........................... 356/2 X
3,761,179  9/1973  Plummer et al. .................... 356/120

OTHER PUBLICATIONS
"Laser Scanning Surface Profilometer," by Harrison, IBM Tech. Disclosure Bull., Vol. 13, No. 3, Aug. 1970, pp. 789–790.

*Primary Examiner*—Ronald L. Wibert
*Assistant Examiner*—Paul K. Godwin
*Attorney, Agent, or Firm*—Milton Zucker

[57] ABSTRACT

An electrooptical sensor is described for providing an output proportional to the surface profile and the first derivative of the surface profile in a noncontacting manner. A narrow, collimated laser beam is scanned across the surface of the article to be measured. The scanning laser beam is produced with a uniformly rotating mirror and a lens, and the scanning beam is nominally perpendicular to the surface of the article being measured. The laser beam reflected by the surface is collected by a lens and focused onto a photoelectric position sensor. The output of the position sensor is proportional to the first derivative of the article surface profile. Since this first derivative will in general include a component originating from the tilt of the article surface relative to the scanning laser beam, means are provided for separating this effect from the intrinsic surface slope. By electronically integrating the first derivative output, an output representing the surface profile is obtained.

4 Claims, 5 Drawing Figures

3,885,875

SHEET 3

NONCONTACT SURFACE PROFILOMETER

BACKGROUND OF THE INVENTION

1. Field of the Invention

The present invention relates to apparatus for the accurate measurement of either the profile of a surface or the first derivative of the surface profile, or both. More particularly, the invention relates to noncontacting electrooptical apparatus for this type of measurement which is capable of rapidly and accurately measuring the profile and profile slopes of reflecting surfaces which need not be critically aligned.

2. The Prior Art

For the accurate measurement of the surface profile of soft, delicate, hot, or moving objects, noncontacting sensors must be used. Prior-art devices of this character include capacitive gauges, eddy-current gauges, air gauges, and optical sensors. Only the optical gauges can work at distances greater than a small fraction of an inch with sufficient sensitivity. In addition, the nonoptical gauges must be mechanically scanned over a surface on very precise ways to obtain a precise surface profile.

Optical sensors have advantages because of the nature of light itself. The principal advantages are:

1. They do not require direct mechanical contact between the sensor and the object to be measured.
2. The distance from the sensor to the object to be measured can be large.
3. The response time is limited to that of the photodetector and its electronics.
4. Light variations are directly convertible to electrical signals.
5. The measurements are independent of the chemical composition of the object.
6. A light beam can be scanned rapidly and precisely.
7. Light does not chemically deteriorate or deform the surface under test.

Prior-art optical sensors include autocollimators, noncontacting probes, image blur detectors, interferometers, and Moire fringe apparatus.

Autocollimators provide very sensitive measurements of surface slopes, but to examine more than one region of a surface requires that either the autocollimator of the article being measured be precisely mechanically scanned.

Similarly, use of an optical probe requires precise mechanical scanning either of the probe or of the article being measured.

The requirement for precise mechanical scanning is undesirable for several reasons. Firstly, the speed of measurement is quite slow because of the time needed to carry out a mechanical scan. Therefore, these techniques are not feasible for measuring large quantities or article. Secondly, maintenance of reliable operation is difficult when mechanical scanning is involved.

An apparatus for measuring automatically the flatness of mirror-reflecting surfaces is disclosed in Plummer et al. U.S. Pat. No. 3,761,179 issued Sept. 25, 1973. This technique is suited to measuring large quantities of articles and is essentially based on image blur sensing for its operation. It is essentially a photoelectric Foucault knife edge-type sensor. Therefore, it works by sensing variations in light intensity produced by the nonflatness of the mirror surface under test. While this technique is useful for some applications, it is quite complex optically, mechanically, and electronically, since it depends on variations of the light intensity to transduce the nonflatness information.

Another type of noncontacting optical sensor commonly used to measure surface profiles is the optical interferometer. While interferometers provide high sensitivity and a data output in the form of a fringe pattern corresponding to a set of surface contours, for applications where the surface errors exceed more than a fraction of a wavelength of the light used the resulting fringe pattern is so complex as to preclude easy interpretation and quantitative use. By photoelectrically sensing the phase information in the fringe pattern, it is of course possible to obviate the above problems, but at a substantial increase in complexity and cost.

Essentially, for many applications, an interferometer is too sensitive. An interferometer's sensitivity can be reduced by working at high angles of incidence to the surface of the article being measured. To achieve a reasonable decrease in sensitivity, the angle of incidence is very large, e.g., 80° – 85°. While the oblique incidence interferometry may be useful for some applications, problems with vignetting and the desire for variable sensitivity preclude its use for many others.

Moire fringe techniques are also used to obtain contours of surfaces. Although the Moire fringe techniques are less sensitive than optical interferometry, a gap exists between these two techniques where neither is very useful.

While these prior-art techniques for measuring surface profiles are useful for some measurements, they cannot be used for accurate measurements required in many industrial operations. For example, in the electronics industry it is desirable to measure the surface profile and nonflatness along a number of diameters of the silicon wafers used in the manufacture of integrated circuits. Similarly, in the electronics industry it is desirable to measure the surface profile and nonflatness along a number of diameters of the glass photo masks used in the photolithography portion of the manufacturing process. In both of these examples, the nonflatness of the surface is in the dimensional range from 0.000005 in. to 0.0005 in., i.e. $\lambda/5$ to $25\lambda$, where $\lambda = 6{,}328$ A, the surfaces are specular reflectors, and large quantities of articles must be measured.

It has been suggested (Harrison — *IBM Technical Disclosure Bulletin*, Vol. 13 No. 3 — August 1970, pages 789 and 790) that scanning of a specular to semi-specular surface with a collimated laser beam, and measuring the displacement of the reflected beam with a photoelectric position sensor, could be used to measure the surface profile of the surface. This technique is well suited to the problem; but the method suggested by Harrison has mechanical and optical difficulties. In order to get the desired results, it is necessary that the surface be perpendicular to the incident light beam, or the resultant profile measurement will include the tilt of the surface. The necessity for such an adjustment precludes rapid measurements, since any mechanical changes in tilt from sample to sample must be adjusted. Moreover, Harrison operates in an off-axis mode with respect to his collimating lens, introducing a rather serious error into his measurements.

OBJECTS OF THE INVENTION

It is an object of the invention to provide an improved electrooptical apparatus capable of the rapid measurement of the surface profile and nonflatness of the surface of many articles, independent of the tilt of the surface.

A further object of the invention is to provide an improved measuring apparatus with easily variable sensitivity, and of good accuracy.

These and other objects will be obvious from the following description of the invention.

STATEMENT OF THE INVENTION

In accordance with the instant invention, we provide (1) a source of radiant energy, most preferably polarized light from a laser, to produce a narrow beam of collimated light; (2) means for focusing said beam onto a uniformly rotating reflective surface; (3) means for collimating said reflected beam to provide a linearly scanned light beam which is scanned across a reflective test article; (4) means for collecting said linearly scanned light beam after it is reflected from the surface of the test article and focusing it onto (5) a photoelectric position sensor; (6) means for processing the output of the position sensor to yield an output indicative of the first derivative of the surface profile of the test article along the line of intersection of the linearly scanned light beam and the surface of the test article; (7) means for processing said first derivative output to produce an output indicative of the surface profile of the test article along the line of intersection of the linearly scanned light beam and the surface of the test article; and (8) means for processing the output of said position sensor in order to assure that the first derivative and surface profile outputs are independent of the tilt or alignment of the surface of the test article relative to the apparatus.

THE DRAWINGS

DETAILED DESCRIPTION OF THE INVENTION

Figure 1:
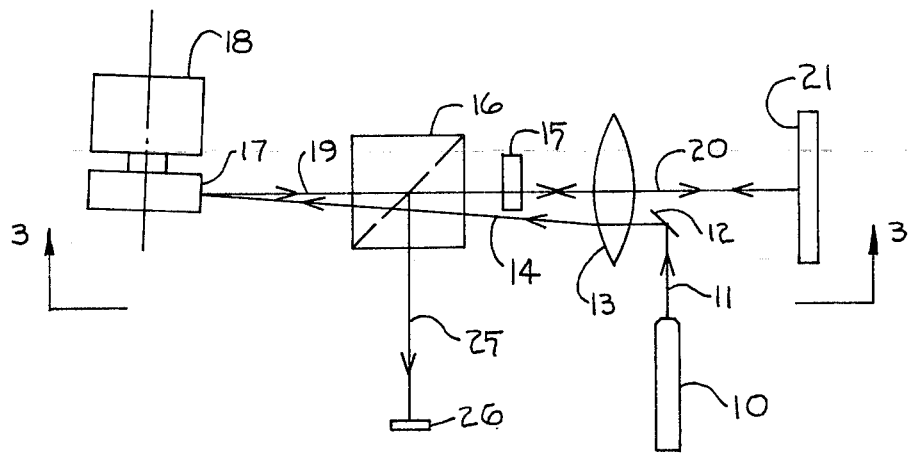
FIG. 1 is a schematic diagram showing a top view of the apparatus' optical system.
Figure 2:
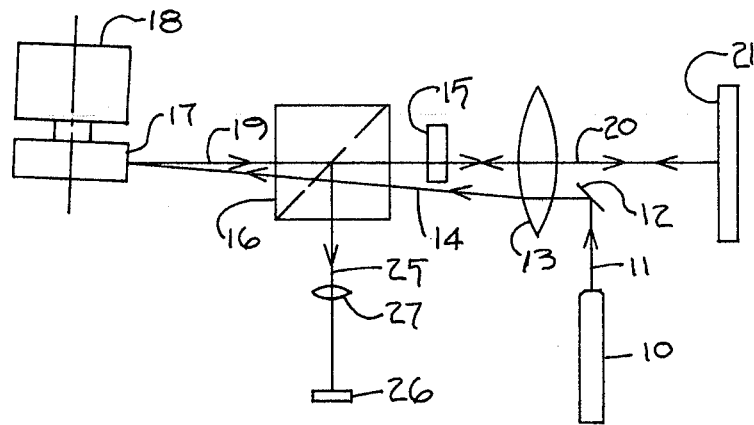
FIG. 2 is a schematic diagram, similar to FIG. 1, of a slightly modified version of the apparatus.

Description and Explanation of FIGS. 1 and 2

While the apparatus has application for a wide range of radiation sources, the following description is taken by way of example with respect to an optical measuring system. The term "radiant energy" as used herein includes, but is not limited to, electromagnetic energy of all frequency ranges.

FIG. 1 is a schematic diagram showing a top view of the apparatus' optical system.

A light source such as a tungsten bulb, xenon bulb, light-emitting diode, laser diode, or other source of radiant energy, and most preferably a gas laser 10, provides optical energy for the narrow, nearly collimated, linearly polarized beam 11 in FIG. 1. Mirror 12 reflects the beam 11 so that the reflected beam is parallel to the optical axis of lens 13. Lens 13 converts the collimated beam 11 into a converging beam 14, and brings the beam 14 to focus on a uniformly rotating scanner prism 17, after it passes through the polarization beam splitter 16. A polarization beam splitter transmits the $p$ polarization component of the input beam and reflects the $s$ polarization component of the input beam. The $p$ label denotes the polarization component in the plane defined by the incident beam and the normal to the beam splitter surface. The $s$ label denotes the polarization component perpendicular to the plane defined by the incident beam and the normal to the beam splitter surface. The orientation of the polarization of the linearly polarized beam 14 is such that it is entirely $p$ component. Thus, beam 14 is essentially completely transmitted by the polarization beam splitter 16. Since the reflection at the rotating prism surface does not alter the state of polarization of the light beam, the beam 19 reflected from the prism mirror surface is essentially totally transmitted by the polarization beam splitter 16 parallel to the optical axis of lens 13. The quarter-wave phase retardation plate 15 has its optic axis oriented at 45° with respect to the direction of polarization of the incident beam 19. The linearly polarized light is thusly converted to circularly polarized light. The reason for using a polarization beam splitter in conjunction with a quarter-wave phase retardation plate is to provide minimum loss of radiant energy at the beam splitter. This configuration increases the light throughput efficiency by about a factor of four over a conventional 50—50 beam splitter for a linearly polarized incident beam.

The beam of light reflected by the scanner prism 17 is a diverging bundle 19 which is angularly scanned in a plane orthogonal to the axis of rotation of the prism 17. Prism 17 is rotated uniformly by the electromechanical transducer 18, which is comprised of a motor and bearing assembly. If sufficient care is taken to assure uniformity of angular velocity during that portion of the scan in which the object is measured, a galvanometric scanner can also be used. Lens 13 recollimates the diverging bundle 19 into a collimated bundle 20, and converts the rotary scanned diverging bundle 19 into a uniformly linearly scanned beam 20. Beam 20 is circularly polarized. Beam 20 is incident upon the surface of the test article 21. The surface of interest should be specularly reflective, approximately flat, and approximately normal to the scanned beam 20. The beam reflected by surface 21 is collected by lens 13 which produces a converging bundle which passes through the retardation plate 15. Since the reflection of surface 21 flips the handedness of the circular polarization, the reflected beam is entirely $s$ polarization after passing through the retardation plate 15. Therefore, the beam is totally reflected by the polarization beam splitter, producing a beam 25 which is focused onto the photoelectric position sensor 26. The position sensor 26 provides an output indicating the position of the spot of light on its photosensitive surface.

FIG. 2 shows a modification of the device of FIG. 1 if greater accuracy is desired. A magnifying lens 27 is positioned in the path of beam 25, in advance of the position sensor 26, thereby increasing the sensitivity of the device, and assuring greater accuracy.

Figure 3:
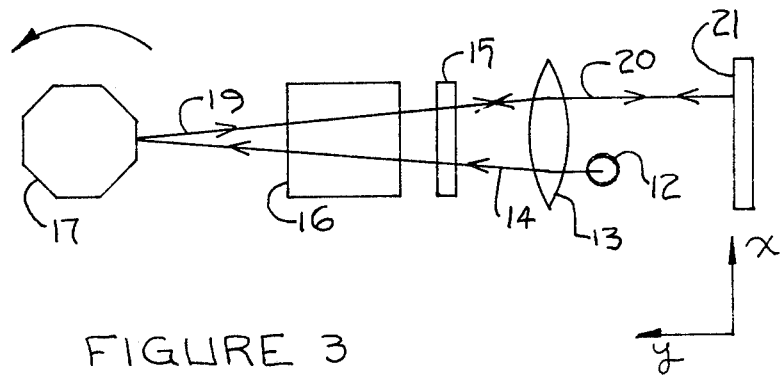
FIG. 3 is a sectional view of the apparatus' optical system, along the line 3—3 of FIG. 1.

Description and Explanation of FIG. 3

Referring to FIG. 3, which is the 3—3 section in FIG. 1, let the profile of the test surface along the line scanned by beam 20 be represented by $y(x)$. The position $D(x)$ of the spot of light in the $x$ direction on the position sensor 26 is given by $$D(x) = 2f[dy/dx + m] \quad (1)$$

where $f$ is the focal length of lens 13 and m is the angular deviation, i.e., tilt, of the surface 21 from perfect perpendicularity to beam 20. m is a constant when the apparatus and test article are fixed relative to each other. The preceding equation can be rewritten in the form $$dy/dx = [D(x)]/(2f) - m \quad (2)$$

thus knowing $D(x)$ and $f$ yield $dy/dx$ to within an unknown constant m. It will be shown later in the description of FIG. 5 how the unknown constant $m$ which is variable from set-up to set-up can be measured and compensated. Nevertheless, integration of equation 2 yields the surface profile $y(x)$.

$$y(x) = \frac{1}{2f} \int_0^x D(x') \, dx' - mk, \quad (3)$$

where $k$ is a constant of integration. For a linearly scanned beam 20, the scan speed $V_s$ is given by $V_s = 2 \cdot \dot{\theta}_m \cdot f$, where $\dot{\theta}_m$ is the angular speed of the scan prism 17, and f is the focal length of lens 13. Since $\dot{\theta}_m$ is a constant, $x = V_s \cdot t$, where $t$ denotes time. Thus, $dx/dt = V_s$. Therefore, the above equations can be represented with $t$ as the independent variable rather than spatial coordinate $x$ using the substitution that $x = V_s t$ and $dx/dt = V_s$. Therefore, equation 3 can be rewritten as $$y(t) = \frac{V_s}{2f} \int_0^t D(t') \, dt' mk \quad (4)$$

It should be noted that for the departures from flatness under consideration, the approximation that the tangent of an angle is equal to the angle in radians is extremely accurate.

Figure 4:
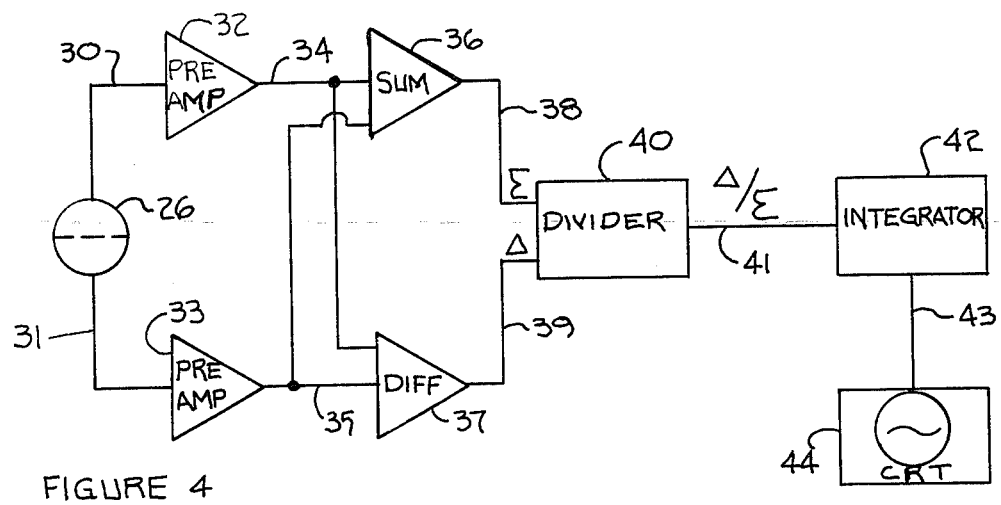
FIG. 4 is a block diagram of the circuitry to yield the first derivative and surface profile outputs.

Description and Explanation of FIG. 4

FIG. 4 is a block diagram of the circuitry to yield the first derivative and surface profile outputs.

The photoelectric position sensor 26 is a commercially available, solid-state device, e.g., the PIN-SC/10 produced by United Detector Technology, Inc., which has two outputs. The outputs are shown as 30 and 31 in FIG. 4. The outputs 30 and 31 represent photoelectric currents. The magnitude of each photoelectric current is proportional to the position of the light spot relative to the zero position and to the light power, i.e., watts, in the spot.

When the spot is centered on the zero position, the two photocurrents 30 and 31 are equal. As the spot moves to one side of the zero position, the photocurrent for that side increases in proportion to the distance moved, and the photocurrent for the other side decreases in proportion to the distance moved. Therefore, the difference between the two sensor photocurrents is a measure of the distance between the center of the light spot and the zero position. However, the constant of proportionality is directly a function of the light power in the light spot. Thus, if either the output power of the laser of the reflectivity of the sample varies, or both vary, uncertainty is introduced in the quantitative information relating the position of the spot to the difference between the two photocurrents. In order to overcome this difficulty, it is necessary to use the ratio of the difference to the sum of the two photocurrents as the quantity which unambiguously indicates the position of the light spot.

In FIG. 4, the preamplifiers 32 and 33 provide impedance matching and voltage outputs proportional to the two photocurrents 30 and 31, respectively. The sum, $\Sigma$, 38, and the difference, $\Delta$, 39, are then used as inputs to divider circuitry 40 which forms the ratio of the difference to the sum. The divider output 41 is directly proportional to the position of the spot of light on the sensor 26. Thus, $D(x)$ in equation 2 is proportional to the output 41. Applying the output 41 to the input of the integrator 42 yields an output 43 which corresponds to $y(t)$ in equation 4.

The output 43 can be displayed on a CRT, i.e., cathode ray tube 44. A commercially available oscilloscope or CRT monitor is suitable for most applications.

The sensitivity on the CRT monitor is easily varied simply by varying the gain on the appropriate scale.

The output 41 is linearly proportional to the first derivative of the surface profile $dy/dx$; however, there is a constant corresponding to the over-all tilt of the sample surface 21 which must be added to the above relation. (See equations 1 and 2.) Therefore, the outputs 41 and 43 contain information about the surface profile alone only when the surface 21 is perpendicular to the scan beam 20. Alignment of surface 21 perpendicular to beam 20 can be done by hand, but this precludes the use of the device in most industrial applications. Therefore, in order for the apparatus to be fully useful in such applications, the processing of the output 41 shown in FIG. 5 is utilized.

Since the output 41 is proportional to the first derivative of the surface profile and the tilt of the article surface, the apparatus itself can be used to measure the tilt on one scan, retain this value, and then subtract this constant from the output of the next scan. In this way, an output directly proportional to the first derivative of the surface profile independent of the surface tilt is obtained.

Figure 5:
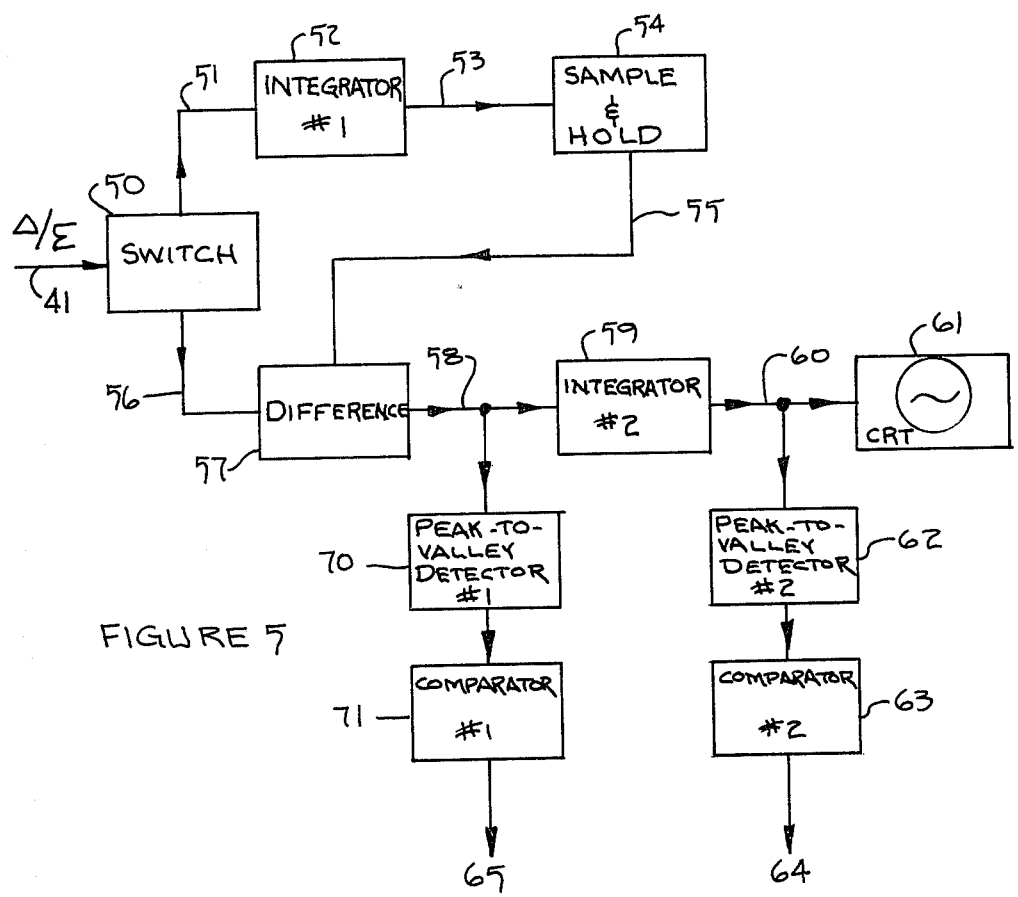
FIG. 5 is a block diagram of the circuitry to yield the first derivative and surface profile outputs which are independent on the alignment of the test surface relative to the apparatus.

Description and Explanation of FIG. 5

In FIG. 5, the output 41, $\Delta/\Sigma$, is applied on alternate scans to the input of integrator No. 1 (52) and the difference circuitry 57.

The solid-state switch and its circuitry 50 perform this function. Switch 50 applies the output 41 to the input of the integrator No. 1 (52) on one scan. Integrator No. 1 (52) has an integration time selected to provide the average slope over the scan. The value of the average slope, output 53, is retained by the sample-and-hold circuitry 54. On the next scan, the switch 50 applies the output 41 to one input of the differencing circuitry 57. The output of the sample-and-hold circuitry 54 is applied to the other input of the differencing circuitry 57. The output 58 of the differencing circuitry is then proportional to the first derivative of the surface profile independent of the tilt of the surface 21. The output 58 is then integrated with integrator No. 2 (59) to provide an output 60 which yields the surface profile independent of the tilt of the surface 21. The surface profile output 60 can be displayed on a CRT 61.

Desirably, the output 58 of the differencing circuitry 57 is applied to a peak-to-valley detector 70, and thence to a first comparator 71, to yield information with respect to the steepness of the slope of the surface along the scanned line. Where the slope must not exceed a preset limit, the output 65 of this comparator can be fed to a go-no-go switch, to automatically pass or reject test articles.

Similarly, the output 60 of the second integrator 59 can be fed to a second peak-to-valley detector 62, and thence to a second comparator 63, to yield departures from flatness over the scanned line. The output 64 of this comparator can be fed to a go-no-go switch, to automatically pass or reject test articles, depending on the departure from flatness.

Since, typically, a scan over a surface such as a silicon wafer can be completed every one-fiftieth to one one-hundredth second, such a surface can be scanned over 50 to 100 lines and still maintain a throughput of 60 wafers per minute. Thus, the device of this invention makes possible rapid automatic testing in high volume or flatness for many articles.

Moreover, if $z$ denotes the coordinate orthogonal to the $x$–$y$ plane of FIG. 3, and if a two-axis position sensor is used, $dy/dz$ can be obtained simultaneously with $dy/dx$, thus getting information on two independent directions simultaneously; processing would be done using separate circuitry as disclosed in FIGS. 4 and 5.

Obviously, changes can be made in the device as described herein without departing from the scope of the invention as defined in the claims.

What is claimed is:

1. A device for measuring the surface profile and the first derivative of the surface profile of a basically flat reflecting object (comprising) (1) a source of radiant energy, and means to produce a narrow collimated beam therefrom; (2) means for focusing said beam onto a uniformly rotating reflective surface to produce a reflected beam on axis with; (3) means for recollimating said reflected beam to produce a linearly scanned beam which is scanned across the surface of said test object and reflected therefrom; (4) means for collecting said beam reflected from said test object and focusing it onto (5) a photoelectric position sensor; (6) means for processing the output of said position sensor to yield an output indicative of the first derivative of the surface profile of the test article along the line of intersection of said linearly scanned beam and the surface of the test object; (7) means for processing said first derivative output to produce an output indicative of the surface profile of the test article along said line of intersection and (8) means for processing the output of said position sensor in order to assure that said first derivative and surface profile outputs are independent of the tilt or alignment of the surface of the test article relative to the apparatus.

2. The device of claim 1, in which the source of energy is a gas laser which produces a narrow collimated beam of polarized light.

3. The device of claim 2, in which the means for collecting and focusing said beam reflected from said test object includes a lens, a retardation plate which passes said beam onto a polarization beam splitter in a single plane of polarization which is substantially totally reflected by said beam splitter, and a lens which focuses said beam reflected from said beam splitter onto said photoelectric position sensor.

4. The device of claim 1, in which the means for processing the output of said position sensor to assure independence of the alignment of said surface of said test object comprises a switch which (1) on a first scan feeds the output indicative of the first derivative of the surface profile of the test object to an integrator whose output provides the average slope over the said scan, the said integrator output being fed to a sample-and-hold device and thence to differencing circuitry, and (2) on the next scan feeds said output indicative of the first derivative of the surface profile of the test object directly into said differencing circuitry, which thereby provides an output which is proportional to the first derivative of the surface profile of said test object independent of the alignment of its surface.

* * * * *